United States Patent [19]
Pongracz et al.

[11] Patent Number: 6,003,044
[45] Date of Patent: Dec. 14, 1999

[54] METHOD AND APPARATUS FOR EFFICIENTLY BACKING UP FILES USING MULTIPLE COMPUTER SYSTEMS

[75] Inventors: Gregory Pongracz, Redwood City; Steven Wertheimer, Kentfield; William Bridge, Alameda, all of Calif.

[73] Assignee: Oracle Corporation, Redwood Shores, Calif.

[21] Appl. No.: 08/962,086

[22] Filed: Oct. 31, 1997

[51] Int. Cl.⁶ .................................................. G06F 12/00
[52] U.S. Cl. .......................................... 707/204; 711/162
[58] Field of Search .................................. 707/204, 200, 707/208, 10; 395/826; 711/161, 162

[56] References Cited

U.S. PATENT DOCUMENTS

| | | | |
|---|---|---|---|
| 5,515,502 | 5/1996 | Wood | 395/182.13 |
| 5,721,916 | 2/1998 | Pardikar | 395/617 |
| 5,790,886 | 8/1998 | Allen | 395/825 |
| 5,799,322 | 8/1998 | Mosher, Jr. | 707/202 |
| 5,819,296 | 10/1998 | Anderson et al. | 707/204 |
| 5,832,522 | 11/1998 | Blickenstaff et al. | 707/204 |
| 5,857,193 | 1/1999 | Sutcliffe et al. | 707/10 |
| 5,857,208 | 1/1999 | Ofek | 707/204 |
| 5,860,122 | 1/1999 | Owada et al. | 711/162 |

*Primary Examiner*—Paul V. Kulik
*Attorney, Agent, or Firm*—Law Offices of Charles E. Gotlieb

[57] ABSTRACT

A system and method backs up computer files to backup drives connected to multiple computer systems. Each file in a backup set is allocated to one or more backup subsets for each of the multiple computer systems. The files can be allocated in an even number across each subset, allocated to evenly spread the number of bytes to each subset, or, using the capacity of each of the multiple computer systems, allocated so that each computer system can complete backing up the files allocated to it in approximately the same amount of time. The system can restrict the number of bytes continuously required from a single disk by one of the backup machines from exceeding a threshold limit. Each of the multiple computer systems is then directed to, and the computer systems do, back up files in one or more subsets, which may be allocated to that computer system.

17 Claims, 5 Drawing Sheets

METHOD AND APPARATUS FOR EFFICIENTLY BACKING UP FILES USING MULTIPLE COMPUTER SYSTEMS

RELATED APPLICATIONS

The subject matter of this application is related to the subject matter of attorney docket number 1027, application Ser. No. 08/962,539 entitled, "METHOD AND APPARATUS FOR RESTORING A PORTION OF A DATABASE" filed on Oct. 31, 1997 by C. Gregory Doherty, Gregory Pongracz, William Bridge, Juan Loaiza and Mark Ramacher, attorney docket number 1028, application Ser. No. 08/962,087 entitled, "METHOD AND APPARATUS FOR IDENTIFYING FILES USED TO RESTORE A FILE" filed on Oct. 31, 1997 by Gregory Pongracz, Steven Wertheimer and William Bridge, attorney docket number 1036, application Ser. No. 08/961,747 entitled, "METHOD AND APPARATUS FOR PRESERVING NON-CURRENT INFORMATION THAT CAN BE OVERWRITTEN IN A COMPUTER FILE" filed on Oct. 31, 1997 by Gregory Pongracz and Tuomas Pystynen, attorney docket number 1038, application Ser. No. 08/961,741 entitled, "METHOD AND APPARATUS FOR ACCESSING A FILE THAT CAN BE CONCURRENTLY WRITTEN" filed on Oct. 31, 1997 by Tuomas Pystynen and Gregory Pongracz having the same assignee as this application and incorporated herein by reference in its entirety.

FIELD OF THE INVENTION

The present invention is related to the backup of computer files and more specifically to the backup of computer files using multiple computer systems.

BACKGROUND OF THE INVENTION

Computer files store information to be used by a computer and are sometimes stored on one or more nonvolatile storage devices, such as hard disks. Because the devices that store computer files are subject to failure, many computer files are backed up by copying the files to a different device, such as a different hard disk or a tape in a tape drive.

A computer program known as a backup program is used to perform the backup process. The operator performing the backup identifies the files to be backed up by including the file names, which may include path identifiers, in a backup set. The operator then runs the backup program against the backup set, and the backup program copies the files in the backup set onto one or more devices identified to the backup program.

Conventional backup programs require that devices such as the tape drives the backup program will use be assigned to the exclusive use of that backup program. In a conventional arrangement, the backup drives assigned to a backup program are connected to the computer running the backup program. For example, in a network of two computers, with three drives connected to each computer, and a copy of a backup program on each of the two computers, the backup program running on the first computer will control the three drives connected to the first computer. Similarly, the backup program running on the second computer will control the three drives connected to that computer.

This arrangement can cause several problems. First, the operator must attend to and run multiple backup programs on each computer to which backup drives are connected. The operator must monitor the operation of these various backup programs, which may provide instructions to mount new tapes as other mounted tapes are filled up. In a network of many computer systems, such monitoring can become extremely burdensome. In addition, it is prone to inefficiencies. A program on one computer may request the mounting of a new tape while the operator is monitoring another program on another computer, causing the first program to sit idle until the operator elects to monitor its operation.

In addition, each backup program requires its own backup set. As used herein, "backup set" is a list of file identifiers such as filename and path to be backed up. If the number of files to be backed up is not evenly distributed among the different backup sets, one backup program may finish and sit idle while another backup program continues working, an inefficient use of the backup drives.

Another problem with conventional backup programs relates to the operation of the tape drive, and the impact this operation may have on the other components of the system. Tape drives are most efficient when the drive "streams". A drive streams when information is supplied to the drive as fast as it is written to the tape, avoiding stopping the tape while waiting for additional information. Stopping a tape and then restarting it when information is available is a relatively lengthy process that inefficiently uses the drive. However, if multiple files are being backed up from a single disk drive, streaming the tape can overwhelm the disk such that performance of the disk for other uses is adversely impacted. Furthermore, because the backup set may describe files stored on disks attached to multiple computers in the network, streaming the tape can cause an increase in network traffic sufficient to slow the performance of the network.

A system and method is therefore needed that is easy to monitor and will efficiently use the backup drives without impacting beyond an acceptable level either the performance of the disks storing the files to be backed up or the performance the network.

SUMMARY OF THE INVENTION

A method and system backs up computer files listed in a backup set onto backup devices attached to multiple computers referred to as backup systems. Each of the backup systems is capable of running one or more processes to backup files as directed by a controller system. The controller system may be the same computer as a backup system, or may be a separate computer system. The controller system allocates files in the backup set to backup subsets, and then directs each backup system to back up the files in at least one backup subset, concurrently with similar operation of the other backup systems or otherwise. The controller system may allocate files from the backup set to the backup subsets so that each backup set has approximately the same number of files or same number of bytes. The controller system may allocate files from the backup set to the backup subsets to minimize the total time required to back up the files. The controller system may allocate files from the backup set to the backup subsets so that the number of files or bytes read from disks not attached to the backup system is minimized, in order to reduce network traffic. The backup systems can communicate with the operator via the controller system, providing a single point of monitoring for the operator.

DETAILED DESCRIPTION OF A PREFERRED EMBODIMENT

Figure 1:
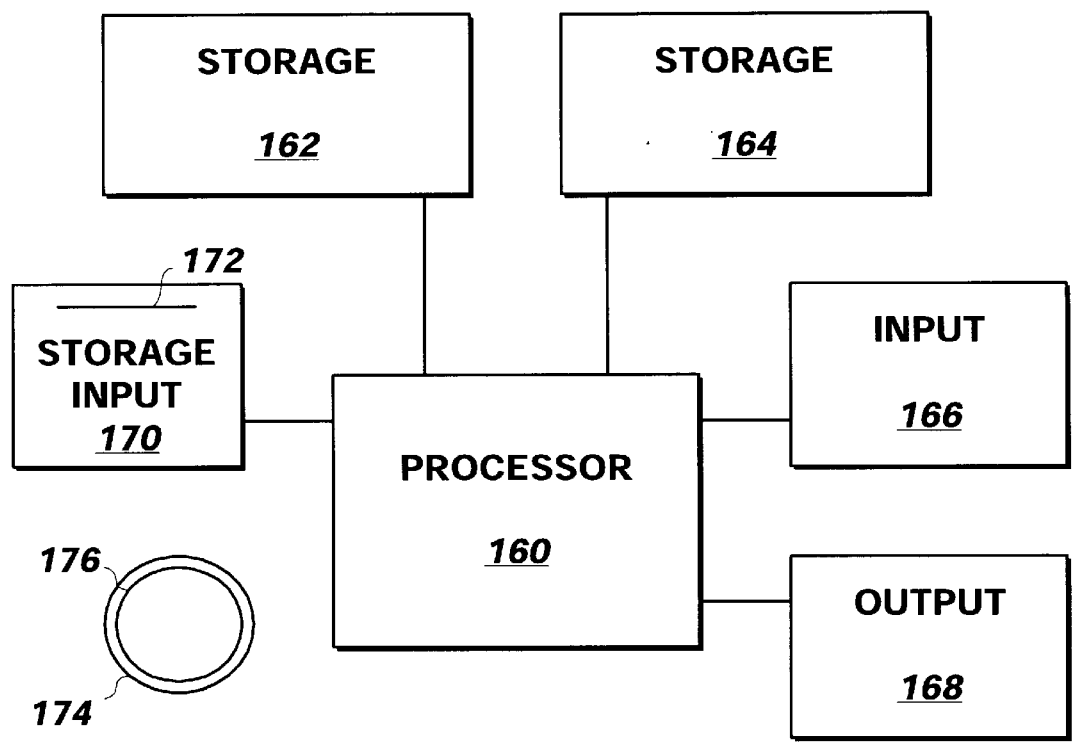
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Palo Alto, Calif., although other systems may be used.

Figure 2:
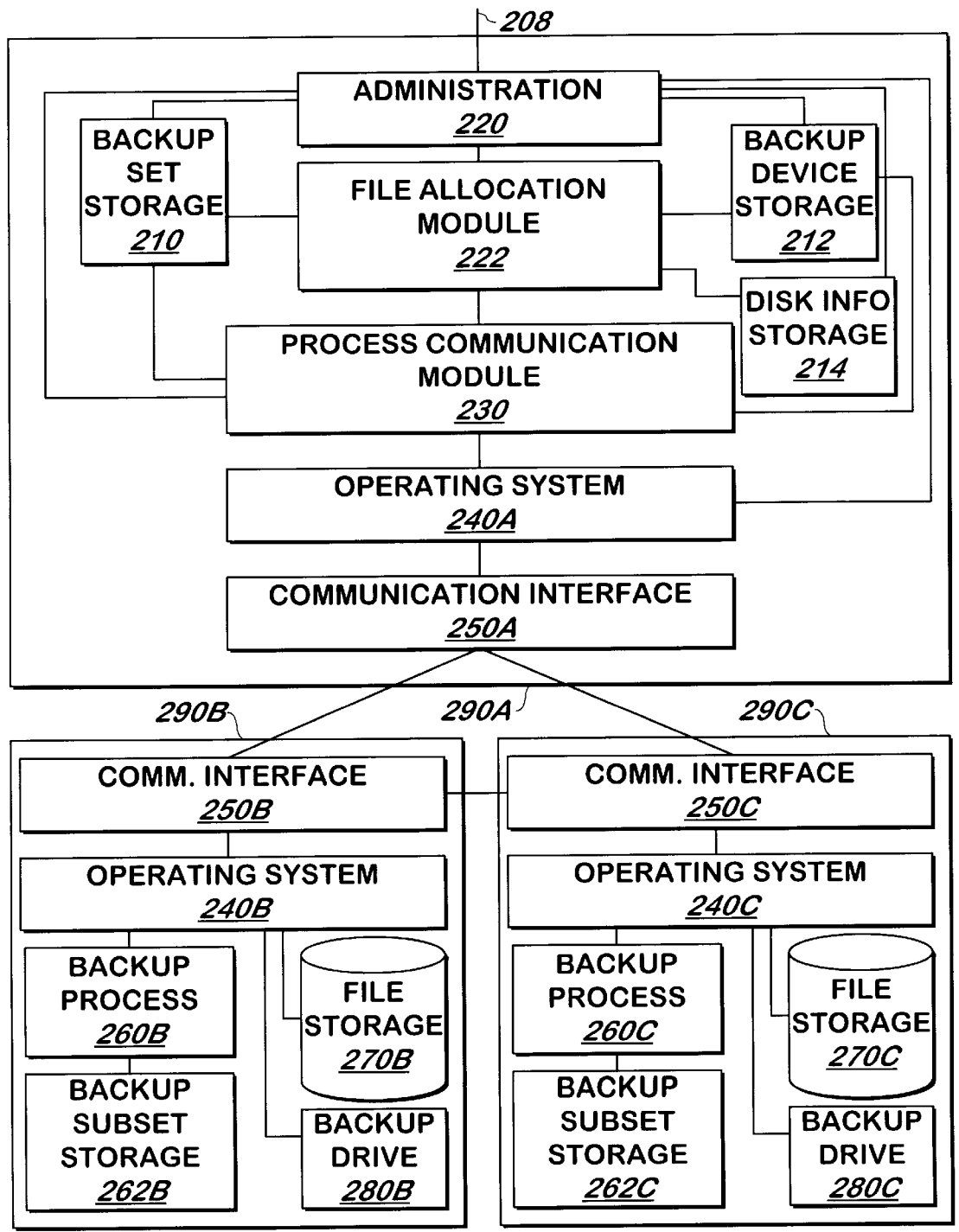
FIG. 2 is a block schematic diagram of a system for backing up computer files in a backup set to backup devices connected to multiple computer systems according to one embodiment of the present invention.

Referring now to FIG. 2, a system for backing up files to backup drives coupled to multiple networked computers is shown according to one embodiment of the present invention. Controller system 290A is coupled to two backup systems 290B, 290C. In one embodiment, controller system 290A operates on one computer system, and each of the backup systems 290B, 290C operate on different computer systems. In another embodiment, controller system 290A operates in the same computer system as one of the backup systems 290B, 290C.

In one embodiment, controller system 290A communicates with backup systems 290B, 290C using conventional communication interfaces 250A, 250B, 250C such as LAN interface cards with suitably installed software in the operating system 240A, 240B, 240C. Backup systems 290B, 290C communicate with each other using conventional communications interfaces 250B, 250C such as LAN interface cards.

A user can input to backup set storage 210 a backup set via input/output 208. As described in more detail below, a controller system 290A allocates the files specified in backup set storage 210 among the backup systems 290B, 290C. Each backup system 290B, 290C receives the names of the files allocated for that system and backs up these files on one or more backup drives 280B, 280C, such as the drive or drives attached to it. FIG. 2 illustrates two backup systems 290B, 290C, each attached to a single backup drive 280B, 280C. However, any number of backup systems connected to any number of backup drives may be employed.

Controller system 290A has an input/output 208 coupled to conventional user input/output devices such as conventional keyboard/mouse/display devices (not shown). Administration 220 accepts via input/output 208 designation of identifiers such as the filenames including path identifiers, of the files contained in the backup set. Administration 220 stores the identifiers of the backup set in backup set storage 210.

Designation of the identifiers of the files contained in the backup set may include designations of files to include in the backup set, such as all the files on a particular drive, all files in a particular directory or individual files, and designations of files to exclude from the backup set, such as all of files on a particular drive, all files in a particular directory or individual files. In one embodiment, the files excluded take precedence over the files included. Therefore, if all the files in a drive are designated in the inclusion list, and one directory stored on that drive is designated in the exclusion list, the backup set stored in backup set storage will include all the files on the drive except those files in the excluded directory.

In one embodiment, administration 220 communicates with the operating systems 240B, 240C of the backup systems 290B, 290C to identify the individual file names corresponding to the designations, and to obtain the number of bytes in each file. This information may be stored in backup set storage 210 in place of the designations. The communication between the administration 220 and each operating system 240B, 240C is performed via operating system 240A, and communication interfaces 250A, 250B, 250C.

Administration 220 also accepts via input/output 208 a description of each backup drive 280B, 280C onto which the files in the backup set stored in backup set storage 210 are to be backed up. Administration 220 stores this information into backup device storage 212. The description of each backup drive may include information about the drive such as its speed and an identifier of the backup system 290B, 290C to which is connected, and may include the maximum capacity of the tapes or other media onto which it stores data.

Administration 220 also accepts via input/output 208 information about the disks or other file storage devices 270B, 270C that hold the data prior to backup. This information may include an identifier of the backup system 290B, 290C to which the file storage device is connected. Administration 220 stores this information in disk information storage 214.

Administration 220 receives via input/output 208 an instruction to begin the backup process. Alternatively, the signal may come from a timer or by administration 220 monitoring the system clock in operating system 240A in response to instructions received via input/output 208 such as "back up all files at midnight". In response to this signal, administration 220 signals file allocation module 222.

File allocation module 222 then allocates the files identified in backup set storage 210 by marking a file identifier in backup set storage 210 as being allocated to a backup subset. File allocation module 222 accomplishes this marking by appending a backup subset identifier to each file identifier stored in backup set storage 210.

In one embodiment, file allocation module 222 allocates files in the backup set to backup subsets without regard to which backup system 290B, 290C will back up the files in the subset. In such embodiment, the user specifies the number of files in each subset at input 208. Administration 220 receives the number of files per backup subset specified by the user and passes the number to file allocation module 222. File allocation module 222 identifies the number of backup subsets by dividing the number of files in the backup set by the number of files per backup subset specified by the user. File allocation module 222 next allocates the files in the backup set to each of these backup subsets.

To allocate the files in the backup set to each of the backup subsets, any of a number of methods may be used. The files may be allocated to subsets by selecting N file identifiers from the backup set at random and assigning them to the first backup subset, and repeating the process for the other backup subsets until all backup subsets are filled. The files in the backup set may be allocated by assigning the first N file identifiers, as they are ordered in the backup set, to the first backup subset, the second N file identifiers in the backup set to the second subset, and so forth, where N is the number of files in each backup subset specified by the user.

Another way of allocating files to backup subsets allocates the files so that the number of bytes per backup subset is approximately even. The file identifiers in the backup subset may be stored in backup set storage 210 with the size of the file. File allocation module 222 performs the allocation by first sorting the file identifiers in backup set storage 210 in order of descending file size. File allocation module 222 next assigns the number of files equal to the number of backup sets calculated as described above by assigning the first M files from the sorted backup set to a different backup subset, where M is the number of backup subsets calculated as described above. File allocation module maintains a size of each backup subset, with an initial value equal to the size of the one file assigned to the backup subset. The remaining file indicators are assigned by file allocation module 222 in the order of the sorted backup set. The file indicator is selected, assigned to the backup subset with the smallest size, and file allocation module 222 adds the size of the file corresponding to the file indicator to the size of the backup subset. The process is repeated for each remaining file indicators in backup set storage 210.

Backup subsets may be allocated file indicators with the intent that a backup subset be processed by a specific backup system 290B or 290C, a type of backup system 290B, 290C or a specific or type of drive 280B, 280C. In one embodiment, each file corresponding to the file indicators in the backup subset is most efficiently retrieved by one of the backup systems 290B, 290C. This may occur because the file is stored on a disk directly connected to the backup system 290B, 290C. In such embodiment, an identifier of the backup system 290B, 290C that can most efficiently retrieve the file is stored with the indicator of the file in backup set storage 210 by administration 220 using the path of the file and a table of backup systems indicating which backup system or systems 290B, 290C can most efficiently backup which path identifiers. In such embodiment, the files in the backup subset may be sorted first by the identifier of the backup system 290B, 290C that can most efficiently retrieve the file, and ties are broken in descending order of the file size. The file allocation process is performed once for each backup system 290B, 290C. For example, the number of files which may be most efficiently retrieved by one backup system 290B or 290C is divided by the number of files per backup subset specified at input 208 to compute M for that backup system 290B or 290C. The allocation process described above is used with files being allocated to a subset only if the file is most efficiently retrieved by that backup system 290B or 290C. The process is repeated for all of the backup systems 290B or 290C until all files are allocated.

Instead of administration 220 receiving at input 208 the number of files per backup subset, administration 220 may receive at input 208 the number of bytes to be stored per subset, and administration 220 passes this number to file allocation module 222. File allocation module 222 computes the number of subsets by dividing the total number of bytes for the files corresponding to the file identifiers in the backup set (or the number of bytes in the backup set that are most efficiently stored by each backup system 290B or 290C) by the number of bytes specified, and optionally adding an additional number to accommodate the fact that some of the subsets will not contain the exact number of bytes specified by the user. File allocation module 222 allocates the file identifiers in the backup set to each of the backup subsets using the procedure described above.

In another embodiment, the user can indicate that the number of backup sets is to be equal to the number of backup drives 280B, 280C to be used to backup the files specified by the backup set. In one such embodiment, the allocation of files identified in the backup set storage 210 is made to approximately evenly distribute the number of bytes in the backup set to each backup drive.

In another embodiment, each backup subset is assigned a capacity based on the size of the media, and the allocation process described above is performed by file allocation module 222 allocating each file identifier in the backup set to the subset with the greatest capacity in which the file will fit after sorting the file identifiers as described above. File allocation module 222 subtracts the size of the file from the capacity of the backup subset after the file identifier is assigned to the backup subset.

In another embodiment, the allocation of files identified in the backup set storage 210 is made so that each backup system 290B, 290C can complete the backup process in approximately the same amount of time. In such embodiment, file allocation module 222 computes the capacity of the subset for each backup system 290B, 290C by summing the number of bytes in the files indicated in backup set storage 210, dividing the result by the total capacity in bytes per second of all backup drives 280, and multiplying by the total capacity in bytes per second of all backup drives 280B, 280C connected to the backup machine 290B, 290C for which the backup subset is assigned. The file identifiers are then sorted and allocated to subsets as described above, using the available number of bytes calculated.

If, as described above, files have been allocated for a specific backup system 290B, 290C or a specific backup drive 280B, 280C, the identifiers of the subset assigned by file allocation module 222 to each file identifier may indicate the backup system 290B, 290C or drive 280B, 280C for which the subset was designed.

The remainder of the description of the system of FIG. 2 will omit referencing backup system 290C as a system in which a backup process is operating. However, it is understood that the same or similar activities described as occurring in backup system 290B will be occurring concurrently or sequentially in backup system 290C.

When the allocation described above is complete, file allocation module 222 signals administration 220. Administration 220 signals process communication module 230. Process communication module 230 transmits a message via operating system 240A and communication interface 250A to the operating system 240B via communication interfaces 250B to initiate the backup process module 260B. In one embodiment, if the backup process module 260B is already running, the backup process module 260B or operating system 240B ignores the message. In such embodiment, the backup process module 260B can direct the activities of more than one backup drive 280B.

In another embodiment, the backup process module 260B can direct the activities of less than all the backup drives 280B connected to the backup system 290B. In such embodiment, the description of the backup device is flagged in backup device storage 212. Process communication module 230 sends a message to initiate the number of backup process modules 230 necessary to backup the files using the information about the backup drives 280B defined in backup device storage 212.

Operating system 240B initiates backup process 260B. In one embodiment, backup process 260B reserves an area of memory for storage as the backup subset storage 262B.

In one embodiment, process communication module 230 selects from backup set storage 210 the subset of the backup set either at random, or a backup subset allocated for the backup system 290B or drive 280B and transmits this backup subset to the backup process module 260B for which the subset was allocated via operating system 240 to communication interfaces 250A, 250B and operating system 240B. Process communication module 230 stores the identifiers of the backup subset and the backup process module 260B or backup system 290B to which it was transmitted. Backup process module 260B stores the subset received into backup subset storage 262B. The backup subset stored in backup subset storage 262B contains the file names and path identifiers of the files to be stored onto the backup drive 280. Backup process module 260B retrieves in the order stored in backup subset storage 262B or otherwise the filename of each file and directs operating system 240B to copy the file from file storage 270B to backup drive 280B.

In one embodiment, if backup process module 260B completes the storage onto the backup device 280B of the backup subset which it was assigned, backup process module 260B will request another backup subset from process communication module 230 by sending to process communication module 230 an identifier of the backup process module 260B. Process communication module 230 marks the files in backup set storage 210 assigned to the backup process module 260B as backed up and if another backup subset is available to be processed by the backup process module 260B requesting an additional subset, process communication module 230 sends the identifier of the backup subset to backup process module 260B.

In another embodiment, process communication module 230 does not send the entire backup subset to each backup process module 260B. Instead, backup process module 260B requests from process communication module 230 via operating system 240B, communication interface 250B, communication interface 250A, and operating system 240A for process communication module 230 to transmit the identifier of the next file allocated for backup system 290B. Process communication module 230 selects the first file identifier in backup set storage allocated for the backup machine 290B or backup process module 260B from which the request was received and transmits it to the requesting backup process module 260B. Backup process module 260B directs operating system 240B to copy the file having the identifier received to the backup drive 280B. Operating system 240B uses conventional methods to copy each file from file storage 270B, 270C to backup drive 280B as directed by backup process 260B. When the next such request is received, process communication module marks the file identifier in backup subset storage 210 as having been backed up, and sends the identifier of the next file in the backup subset in backup set storage 210.

In one embodiment, the user can specify at input 208 a maximum number of bytes per second that each backup process 260 is able to read from the file storage 270B from which the file is stored. Administration 220 receives a single number for all backup processes 260B or one number for each backup process 260B and passes the number or these numbers to process communication module 230. Process communication module 230 transmits the appropriate number of bytes per second to backup process 260B when process communication module 230 initiates the backup process. Each second, backup process 260B sets a timer and requests from operating system 240B the number of bytes transferred, and if the number of bytes retrieved from a file storage 270B reaches the maximum specified by the user before one second elapses, backup process 260B directs backup drive 280B to interrupt the backup process, and at the end of the one second period, directs backup drive 280B to resume backing up. In this manner, the number of bytes retrieved from a single device is limited per one second period, preventing the system shown in FIG. 2 from using so much capacity of a file storage 270B that other processes using the file storage 270B are impacted.

In another embodiment, the number received at input 208B is a maximum number of bytes to be continuously read. In such embodiment, files in the backup subset are stored sequentially. Backup process 260B reads the number of bytes specified, then stores that many bytes on the drive and moves on to perform the same function for the next file in the backup subset. When backup process 260 reads the last file in the subset, the process is repeated until all files in the subset have been stored using the backup drive 280B.

In one embodiment, each of the backup process modules 260B communicates operator messages such as "out of tape" messages by sending such messages to process communication module 230 via operating system 240B, communication interface 250B, communication interface 250A, and operating system 240A. Process communication module 230 passes these messages to administration 220 for display to a user via input/output 208 coupled to a monitor or other display device.

Figure 3A:
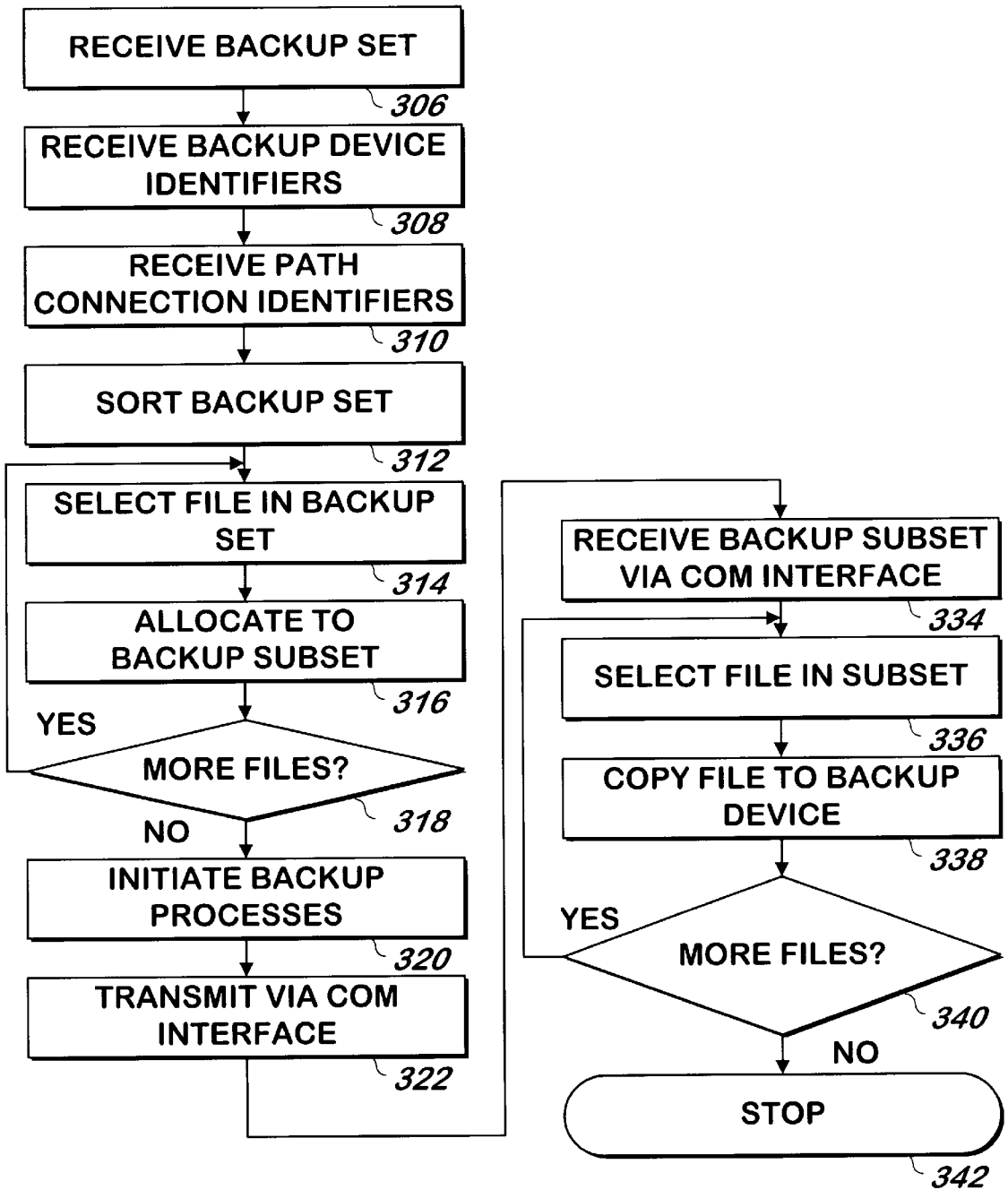
FIG. 3A is a flowchart illustrating a method of backing up computer files in a backup set to backup devices connected to multiple computer systems according to one embodiment of the present invention.

Referring now to FIG. 3A, a method of backing up files is shown according to one embodiment of the present invention. A backup set is received 306. The backup set received in step 306 may include, for each file desired to be backed up, a filename including a path identifier that identifies the drive on which the file is stored. Backup device identifiers are received 308 identifying the number or location or capacity or speed of each backup drive onto which the files identified in the backup set received in step 306 are to be backed up. Path connection identifiers may also be received 310. Path connection identifiers identify the system to which the drive or drives that use a path identifier are connected. In one embodiment, the drives are identified by a path identifier, such as, "C:\".

The backup set may be sorted 312, for example by size of the file as described above. Each file in the backup set is selected 314 and allocated to one of several backup subsets 316 as described above until all files in the backup set have been allocated to a backup subset 318. The allocation may be performed to provide the same number of files in each subset, to provide the same number of bytes in each subset, to provide for a number of bytes that will cause each subset to be backed up in a similar amount of time as the other subsets or using other allocation arrangements as described above or elsewhere. One backup process is initiated 320 for each backup system or for each backup drive as described above.

Identifiers of the files allocated in a backup subset are transmitted 322 via the communication interface as described above and received 334 via a communications interface, with each backup subset being received by a backup process initiated in step 320. In one embodiment, step 322 is performed for each of several backup processes and steps 334–342 are duplicated concurrently or approximately concurrently for at least two of the backup processes initiated in step 320.

Each file in the backup subset is selected 336 and copied to the backup device 338 such as a tape drive until no more files are in the backup subset 340, at which point the method terminates 342 in one embodiment.

Figure 3B:
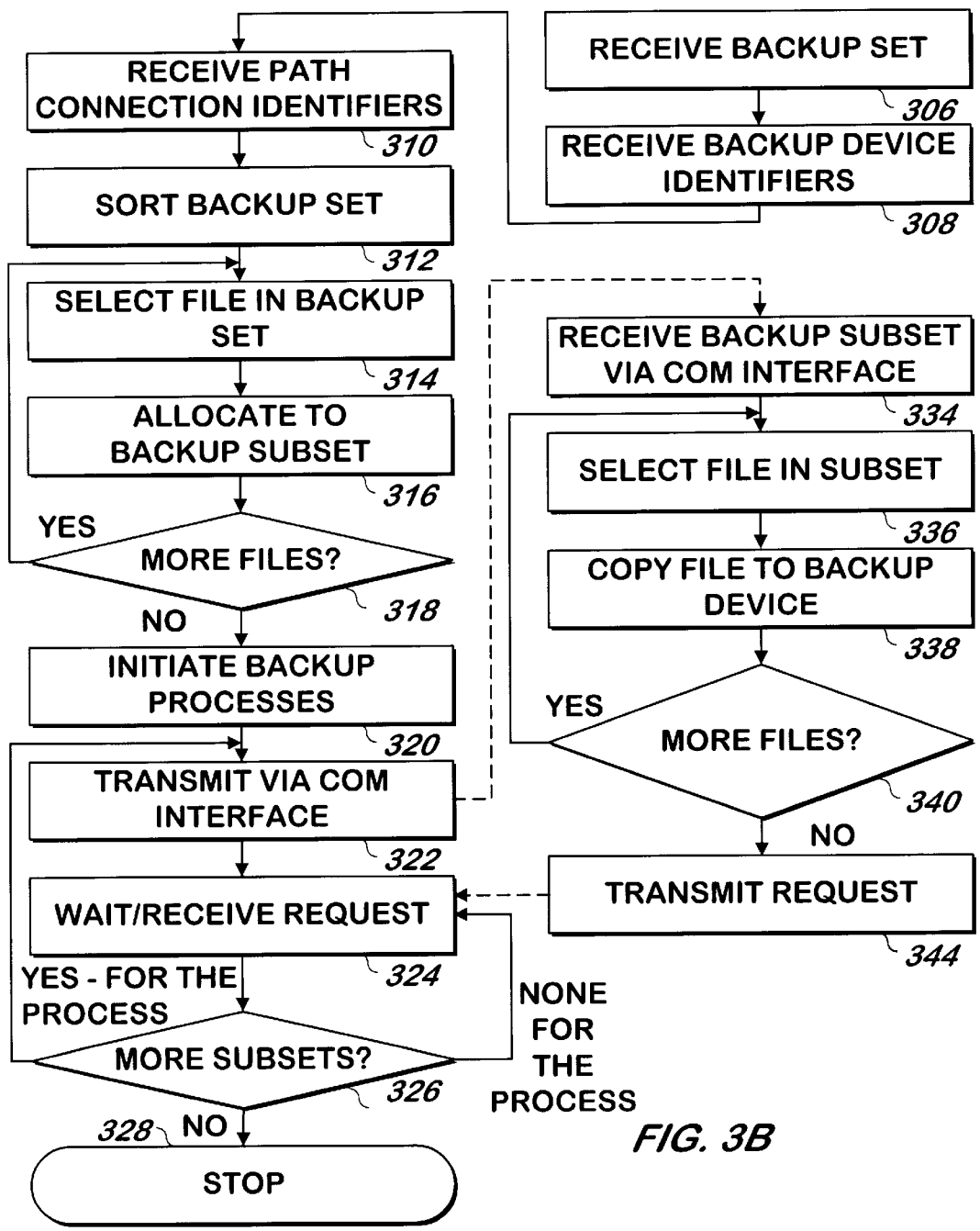
FIG. 3B is a flowchart illustrating a method of backing up computer files in a backup set to backup devices connected to multiple computer systems according to an alternate embodiment of the present invention.

Another embodiment is shown in FIG. 3B, which operates as FIG. 3A except as noted below. After transmission step 322, the left branch of the FIG. 3B waits 324 to receive additional backup set requests from one or more of the processes running the right branch of FIG. 3B, steps 334 through 344. Such a request is generated 344 when all files in a backup subset have been backed up, in place of the termination step 342 of FIG. 3A. If a request for another backup set is received, and if a backup subset is available for processing by the requesting process 326, the method repeats at step 322 by transmitting such subset to the requesting process. If more subsets exist only for other processes, the left branch of the method waits (while the right branch continues executing) to receive additional requests at step 324. Step 324 may include marking the subset backed up by the process from which the request was received in step 324 as completed. If there are no more subsets to be processed, the method terminates 328. In one embodiment, step 328 includes directing all of the processes running steps 334 through 344 to terminate when all files in the backup set being processed are backed up. The dashed line in the FIG. 3B indicates the steps 334 through 342 operate in parallel with the other steps 322 through 328 and other processes performing steps 334 through 344.

Figure 3C:
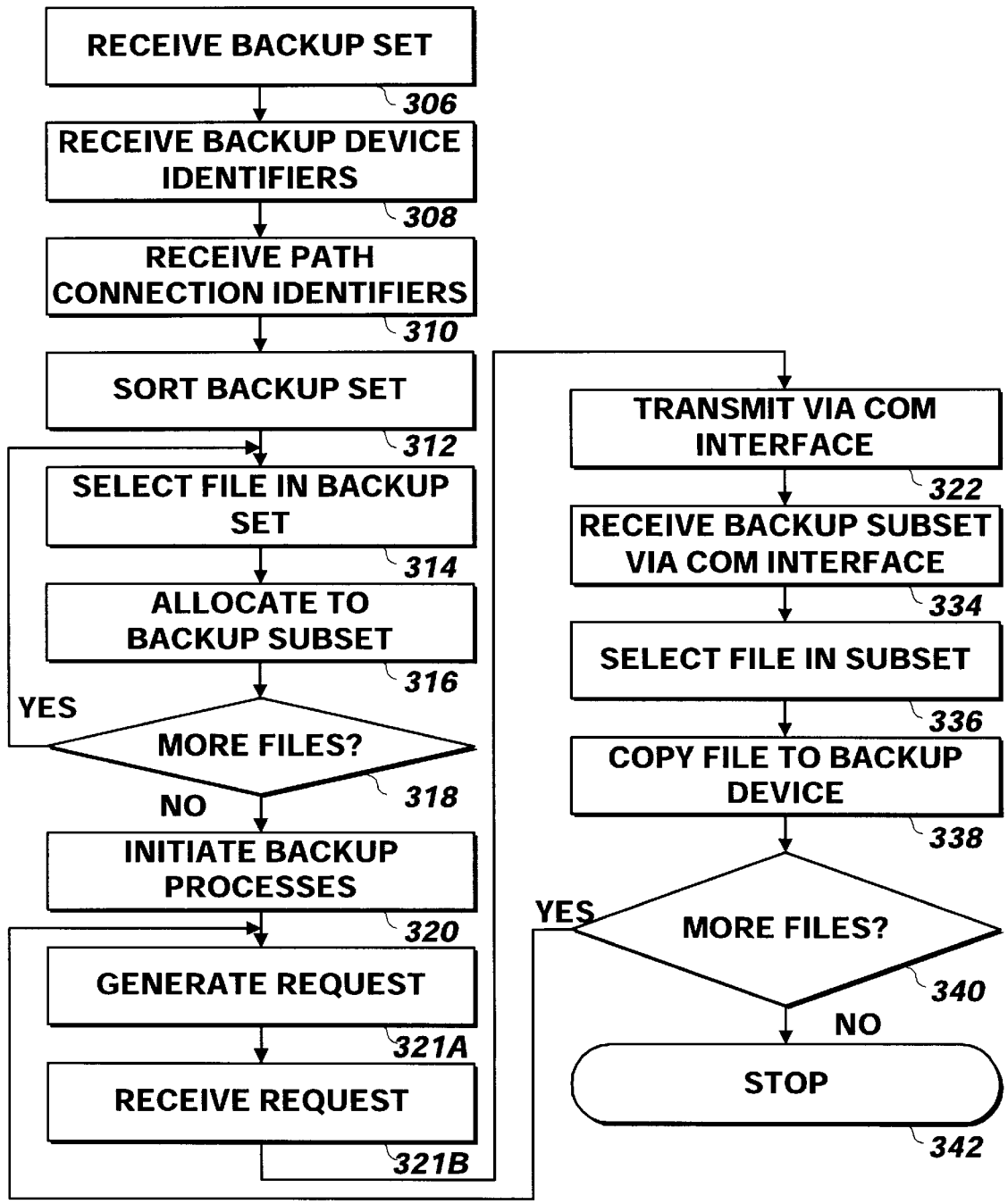
FIG. 3C is a flowchart illustrating a method of backing up computer files in a backup set to backup devices connected to multiple computer systems according to an alternate embodiment of the present invention.

In one embodiment, the transmitting step 322 and the receiving step 334 is performed after the initiate step 320. In another embodiment, a request to transmit is generated and received, for example from a backup system to a controller system. In one embodiment, the transmit step 322 and receive step 334 is for a backup subset, and in another embodiment, the transmit and receive steps are for a single file. Referring now to FIG. 3C, an embodiment, illustrating the generation and receipt of a request and the transmission and receipt of the backup subset one file identifier at a time is shown according to one embodiment of the present invention. Generation and receipt steps 321A, 321B are inserted before step 322 and if there are more files in the backup set, processing continues at step 321A. The remainder of the method operates as described above with reference to FIG. 3A.

What is claimed is:

1. An apparatus for backing up a plurality of files, comprising:

a controller machine having an input operatively coupled to receive at least one backup set comprising at least one identifier of the files and to receive at least one set of information corresponding to a backup drive, the controller machine for allocating the at least one identifier in the at least one backup set into a plurality of drive backup sets, and for transmitting the drive backup sets to an output; and at least one backup machine having an input coupled to the controller machine output, for receiving at least one drive backup set and for retrieving files corresponding to the identifiers in the drive backup set and transmitting said files to a backup drive for storage.

2. A method of backing up files, comprising:

receiving a backup set comprising a description of a plurality of files to be backed up;

allocating file identifiers of the plurality of files to a plurality of backup subsets;

providing the file identifiers in at least a first one of said plurality of backup subsets so as to cause the files corresponding to the file identifiers in the at least first one of said plurality of backup subsets to be copied onto a first backup media; and providing the file identifiers in at least a second, different from the first, one of said plurality of backup subsets so as to cause the files corresponding to the file identifiers in the at least second one of said plurality of backup subsets to be copied onto a second backup media different from the first backup media.

3. The method of claim 2, wherein the allocating step comprises assigning substantially a same number of file identifiers to each of a plurality of the backup subsets.

4. The method of claim 3, wherein the assigning step comprises, for each of a plurality of the backup subsets, selecting at random a plurality of file identifiers from file identifiers corresponding to the backup set.

5. The method of claim 3, wherein the assigning step comprises, for each of a plurality of the backup subsets, selecting a plurality of file identifiers having a sequential order according to the first backup set.

6. The method of claim 2, wherein the allocating step comprises assigning approximately a same number of bytes to each of a plurality of the backup subsets.

7. The method of claim 2, wherein the allocating step comprises identifying a backup subsystem from a plurality of backup subsystems capable of most efficiently backing up each of a plurality of files.

8. The method of claim 2, wherein:

the file identifiers in the first one of the plurality of backup subsets are provided to a first computer system; and the file identifiers in the second one of the plurality of backup subsets are provided to a second computer system different from the first computer system.

9. The method of claim 8, wherein:

the file identifiers in the first one of the plurality of backup subsets are provided to the first computer system in response to a plurality of requests received from the first computer system; and the file identifiers in the second one of the plurality of backup subsets are provided to the second computer system in response to a plurality of requests received from the second computer system.

10. A computer program product comprising a computer useable medium having computer readable program code embodied therein for backing up files, the computer program product comprising:

computer readable program code devices configured to cause a computer to receive a backup set comprising a description of a plurality of files to be backed up;

computer readable program code devices configured to cause a computer to allocate file identifiers of the plurality of files to a plurality of backup subsets;

computer readable program code devices configured to cause a computer to provide the file identifiers in at least a first one of said plurality of backup subsets so as to cause the files corresponding to the file identifiers in the at least first one of said plurality of backup subsets to be copied onto a first backup media; and computer readable program code devices configured to cause a computer to provide the file identifiers in at least a second, different from the first, one of said plurality of backup subsets so as to cause the files corresponding to the file identifiers in the at least second one of said plurality of backup subsets to be copied onto a second backup media different from the first backup media.

11. The computer program product of claim 10, wherein the computer readable program code devices configured to cause a computer to allocate comprise computer readable program code devices configured to cause a computer to assign substantially a same number of file identifiers to each of a plurality of the backup subsets.

12. The computer program product of claim 11, wherein the computer readable program code devices configured to cause a computer to assign comprise computer readable program code devices configured to cause a computer to, for each of a plurality of the backup subsets, select at random a plurality of file identifiers from file identifiers corresponding to the backup set.

13. The computer program product of claim 11, wherein the computer readable program code devices configured to cause a computer to assign comprise computer readable program code devices configured to cause a computer to, for each of a plurality of the backup subsets, select a plurality of file identifiers having a sequential order according to the first backup set.

14. The computer program product of claim 10, wherein the computer readable program code devices configured to cause a computer to allocate comprise computer readable program code devices configured to cause a computer to assign approximately a same number of bytes to each of a plurality of the backup subsets.

15. The computer program product of claim 10, wherein the computer readable program code devices configured to cause a computer to allocate comprise computer readable program code devices configured to cause a computer to identify a backup subsystem from a plurality of backup subsystems capable of most efficiently backing up each of a plurality of files.

16. The computer program product of claim 10, wherein:

the file identifiers in the first one of the plurality of backup subsets are provided to a first computer system; and the file identifiers in the second one of the plurality of backup subsets are provided to a second computer system different from the first computer system.

17. The computer program product of claim 16, wherein:

the file identifiers in the first one of the plurality of backup subsets are provided to the first computer system in response to a plurality of requests received from the first computer system; and the file identifiers in the second one of the plurality of backup subsets are provided to the second computer system in response to a plurality of requests received from the second computer system.

* * * * *